United States Patent [19]
Ballard

[11] 3,776,747
[45] Dec. 4, 1973

[54] HIGH TEMPERATURE RESISTANT COATING

[75] Inventor: Norman Edmund Ballard, Derby, England

[73] Assignee: Rolls-Royce (1971) Limited, Derby, England

[22] Filed: Feb. 10, 1972

[21] Appl. No.: 225,062

Related U.S. Application Data

[63] Continuation-in-part of Ser. No. 136,537, April 22, 1971, abandoned.

[30] Foreign Application Priority Data

Apr. 24, 1970 Great Britain.................... 19,761/70

[52] U.S. Cl. .................................................. 106/84
[51] Int. Cl................................................ C09d 1/02
[58] Field of Search................................ 106/74, 84

[56] References Cited
UNITED STATES PATENTS

| | | | |
|---|---|---|---|
| 3,423,229 | 1/1969 | Kompanek et al..................... | 106/84 |
| 3,656,975 | 4/1972 | Phelps et al. ......................... | 106/84 |
| 1,771,605 | 7/1930 | Bailey .................................... | 106/74 |
| 2,926,098 | 2/1960 | Ilenda et al........................... | 106/74 |

*Primary Examiner*—James E. Poer
*Attorney*—John W. Malley et al.

[57] ABSTRACT

A composition for coating steel components, such as the compressor parts of gas turbine engines consisting essentially of from two parts to half a part by weight of potassium silicate; from one part to two parts by weight of finely divided aluminum powder, from one quarter to three quarters of a part by weight of a polyhydroxy alcohol and sufficient water to produce a viscosity of up to and including forty seconds when measured on a British Standard number 4 flow cup at 20° C.

3 Claims, No Drawings

HIGH TEMPERATURE RESISTANT COATING

This application is a continuation-in-part of applicants application Serial No. 136,537, now abandoned.

This invention relates to high temperature resistant coatings.

It is sometimes necessary to protect metal components against corrosion by atmospheric constituents, and a paint coating is frequently chosen to provide such protection. This problem becomes more difficult when the components concerned operate at elevated temperatures, and may be particularly difficult to overcome when the atmosphere contains a relatively high proportion of salt. A particular instance where this combination of circumstances arises is in compressor parts of gas turbine engines which spend a high proportion of their operating time in marine conditions.

The present invention relates to a coating which has been found to be highly efficacious under such circumstances.

According to the present invention, a composition for coating steel components consists essentially of from two parts to half a part by weight of potassium silicate; from one part to two parts by weight of finely divided granular aluminium powder; from one quarter to three quarters of a part by weight of polyhydroxy alcohol and sufficient water to produce a viscosity of up to and including 40 seconds when measured on a British Standard number 4 flow cup at 20°C.

Where the coating is intended to be sprayed, the preferred composition is one part by weight of a 50 percent aqueous solution of potassium silicate having a mean weight ratio $SiO_2:K_2O$ of between 1.43 and 2.05; one and one quarter parts by weight of finely divided granular aluminium powder; half a part by weight of glycerol and sufficient water to produce a viscosity of from 15 to 25 seconds when measured on a British Standard number 4 flow cup at 20°C.

However, when the coating composition is to be electrophoretically applied we prefer to use one part by weight of a 50 percent aqueous solution of potassium silicate having a mean weight ratio $SiO_2:K_2O$ of between 1.43 and 2.05; two parts by weight of finely divided granular aluminium powder; half a part by weight of glycerol and one and a half parts by weight of water.

The preferred method of application of the coating composition comprises air drying the paint coating and subsequently heat treating it from 150°C to 190°C for 2 hours and at 560°C for 2 hours.

In an example of a method according to the present invention the coating composition was made up by mixing one part by weight of a 50 percent aqueous solution of potassium silicate having a mean weight ratio $SiO_2:K_2O$ of 1.05 with one and one quarter parts by weight of finely divided granular aluminium powder having a particle size of between 5 and 10 microns and being wax free, half a part by weight of glycerol and sufficient water to produce a viscosity of 16 seconds when measured with a British Standard number 4 flow cup at 20°C.

The potassium silicate was that supplied by Crossfield Chemicals Limited of Warrington England under the designation "Grade 66." We believe however that other grades of potassium silicate supplied by Crossfields, namely grades 70, 82, 84 and 120 having mean weight ratios $SiO_2:K_2O$ of 2.05, 2.01, 1.89 and 1.43 respectively, would be equally suitable for use in the coating composition.

The glycerol is added to the coating composition in order to adjust the solvent balance thereof so as to achieve optimum spraying properties and to provide a more thorough cure. Although glycerol is used in the present example, it will be appreciated that other polyhydroxy alcohols such as glycol would be as equally effective.

The coating composition was sprayed on to test panels of 12 percent chromium steel. The wet coating was then air dried for 15 minutes to give a coating of 1½ to 2 thousandths of an inch in thickness. The test panels were then heat treated between 150°C and 190°C for two hours and subsequently further heat treated for two hours at 560°C. The test panels were used to determine the coating's resistance to lubricating oils, hydraulic fluids, oil fuels and various coolants and the coating was found to be substantially unaffected by contact with these liquids. The panels were next tested for their resistance to dry heat and it was found that the coating resisted temperatures up to some 650°C. Similar tests involving heating at 450°C followed by exposure to salt spray showed that the panels had satisfactory resistance to marine atmospheres, and tests of a similar nature using panels with substantially damaged coatings indicated that a sacrificial electrolytic protection was given by the coating to uncoated areas. Final erosion tests were carried out using a carefully controlled sandblasting technique, and test panels using the present coating composition were found to be at least as good as any commercially available coating.

In a second series of examples a different coating compositions mixture was used; in this case one part by weight of the "66 grade" silicate solution was mixed with two parts by weight of finely divided aluminium powder having a particle size of between 5 and 10 microns, one-half a part by weight of glycerol and one and a half parts by weight of water. In this case similar panels were coated by electrophoresis; that is they were immersed in the liquid and an electric current between a ¼ and 1 amp per square inch passed between the panels and the liquid for some 1¾ to 1½ minutes. This coating composition and deposition treatment gave a coating of between 4/5 and 2 thousandths of an inch which was otherwise very similar to that produced in the first set of examples, and which was heat treated under similar conditions and gave very similar test results. We believe that the difference in coating composition constituents is necessary because of the differing mobilities of the constituents when applied electrophoretically.

It will be appreciated that various modifications could be made to the constituents within the ranges set out above, and that although the examples used a particular material for the test panels, it will be possible to use a variety of steels.

I claim:

1. A high temperature resistant composition for coating steel components consisting essentially of from two parts to half a part by weight of potassium silicate; from one part to two parts by weight of finely divided granular aluminium powder; from one quarter to three quarters of a part by weight of a polyhydroxy alcohol and sufficient water to produce a viscosity of up to and including forty seconds when measured on a British Standard number 4 flow cup at 20°C.

2. A composition as claimed in claim 1 and which is adapted to be applied as a spray consisting essentially of one part by weight of a 50 percent aqueous solution of potassium silicate, which potassium silicate has a mean weight ratio $SiO_2:K_2O$ of between 1.43 and 2.05; one and one quarter parts by weight of finely divided granular aluminium powder; half a part by weight of glycerol and sufficient water to produce a viscosity of from 15 to 25 seconds when measured on a British Standard number 4 flow cup at 20°C.

3. A composition as claimed in claim 1 and which is adapted to be applied electrophoretically consisting essentially of one part by weight of a 50 percent aqueous solution of potassium silicate, which potassium silicate has a mean weight ratio $SiO_2:K_2O$ of between 1.43 and 1.05; two parts by weight of finely divided grannular aluminium powder; half a part by weight of glycerol and one and a half parts BY weight of water.

* * * * *